United States Patent [19]

Mesenich

[11] Patent Number: 4,810,985
[45] Date of Patent: Mar. 7, 1989

[54] ELECTROMAGNET FOR VALVES

[75] Inventor: Gerhard Mesenich, Bochum, Fed. Rep. of Germany

[73] Assignee: Colt Industries, Inc., New York, N.Y.

[21] Appl. No.: 188,063

[22] Filed: Apr. 27, 1988

Related U.S. Application Data

[63] Continuation of Ser. No. 124,951, Nov. 24, 1987, abandoned, which is a continuation of Ser. No. 75,049, Jul. 17, 1987, abandoned, which is a continuation of Ser. No. 941,132, Dec. 12, 1986, abandoned, which is a continuation of Ser. No. 862,176, May 9, 1986, abandoned, which is a continuation of Ser. No. 602,604, Apr. 20, 1984, abandoned.

[30] Foreign Application Priority Data

Apr. 25, 1983 [DE] Fed. Rep. of Germany ....... 3314900

[51] Int. Cl.[4] ............................................. H01F 7/08
[52] U.S. Cl. ................................... 335/261; 335/279; 335/281
[58] Field of Search ................ 335/249, 251, 255, 261, 335/279, 281

[56] References Cited

U.S. PATENT DOCUMENTS

| 506,282 | 10/1893 | Timmis | 335/261 |
|---|---|---|---|
| 750,132 | 1/1904 | Timmis et al. | 335/261 |
| 2,098,196 | 11/1937 | Ray | 175/338 |
| 2,992,304 | 7/1961 | Andrews | 335/261 |
| 3,538,954 | 11/1970 | Fagerlie et al. | 137/625.65 |
| 3,593,240 | 7/1971 | Garczynski | 335/261 X |
| 4,491,816 | 1/1985 | Blum | 335/261 X |

FOREIGN PATENT DOCUMENTS

| 0054107 | 6/1982 | European Pat. Off. . |
|---|---|---|
| 447310 | 7/1927 | Fed. Rep. of Germany . |
| 697554 | 10/1940 | Fed. Rep. of Germany . |
| 2153224 | 5/1973 | Fed. Rep. of Germany . |
| 2416119 | 10/1974 | Fed. Rep. of Germany . |
| 2166608 | 11/1974 | Fed. Rep. of Germany . |
| 2343510 | 3/1975 | Fed. Rep. of Germany . |
| 3149916 | 7/1982 | Fed. Rep. of Germany . |
| 615035 | 12/1926 | France . |
| 2412159 | 7/1979 | France . |
| 853651 | 11/1960 | United Kingdom . |
| 1035726 | 7/1966 | United Kingdom . |
| 1064679 | 4/1967 | United Kingdom . |
| 1073427 | 6/1967 | United Kingdom . |
| 1305774 | 2/1973 | United Kingdom . |
| 1553637 | 10/1979 | United Kingdom . |
| 2107524 | 4/1983 | United Kingdom . |

Primary Examiner—George Harris
Attorney, Agent, or Firm—Walter Potoroka, Sr.

[57] ABSTRACT

An electromagnet, for valves, comprises thin-walled axially symmetrical parts and is adapted to different uses by special air gap arrangements and armature suspensions; the electromagnet generates high magnet forces at low armature mass and is employable, in particular, for actuation of fuel injection valves for internal combustion engines and in general hydraulics; the electromagnet possesses a high mechanical stability and eddy current depletion combined with simple armature suspension and low cost of manufacture.

34 Claims, 11 Drawing Sheets

ELECTROMAGNET FOR VALVES

RELATED APPLICATION

This application is a continuation of application Ser. No. 124,951 filed Nov. 24, 1987, which is a continuation of application Ser. No. 075,049 filed July 17, 1987 which is a continuation of application Ser. No. 941,132 filed Dec. 12, 1986, which is a continuation of application Ser. No. 862,176 filed May 9, 1986, which, in turn, is a continuation of application Ser. No. 602,604 filed Apr. 20, 1984, for "Electromagnet for Valves", all now abandoned.

FIELD OF THE INVENTION

This invention relates generally to valving means for controlling fluid flow and more particularly to electromagnetic means employable for actuation of such valving means.

BACKGROUND OF THE INVENTION

Heretofore, the prior art has proposed many magnetic circuit forms of electromagnets as for the acutation of associated valves. Such prior art electromagnets usually have solid armatures and cores which, in those situations where rapid cyclic energization and de-energization of the field coil are experienced, result in high eddy current losses.

The prior art, in attempting to reduce the eddy current losses, has proposed forming the magnetic circuit as of thin stacked laminations of magnetizable material. However, such prior art laminated structures have not been generally accepted because they are expensive to produce and the mechanical strength thereof is relatively weak.

For a better understanding of the invention as compared to the prior art, FIG. 1 illustrates, typically, a fuel injection valve assembly, as for use in combination with an internal combustion engine, which employs the usual prior art magnetic circuit. In the prior art magnetic circuit of the structure of FIG. 1, the magnetic circuit consists of a generally solid armature 5 and the magnetic flux return consists of the housing 1 and core 3. The magnetic circuit has two air gaps one of which is the variable working air gap between the core 3 and armature 5 and the other of which is the almost constant radial air gap between the armature 5 and housing 1. In the embodiment of FIG. 1, the armature 5 has a needle valve 9 fixedly secured thereto for movement in unison therewith. The needle valve 9 is slidably received, for reciprocating movement, within a valve body portion 10.

Still with reference to FIG. 1, when the field coil 4 is energized the magnetic flux in the magnetic circuit increases. Because of such flux increase there occurs, mainly in the core 3 and armature 5, strong eddy currents which urge the magnetic field to the surface of the magnetic circuit Therefore, in the working air gap (the gap between armature 5 and core 3) initially only a portion of the armature cross-sectional area is fully permeated by the magnetic field which, in turn, has the effect of reducing the otherwise available pull-up (as viewed in FIG. 1) force on the armature 5 and, consequently, reducing the pull-up velocity of armature 5 and needle valve 9.

Further, the flux increase follows the energizing or exciting current with a phase shift which usually results in an unfavorable magnetic force pattern having a greatly increasing force toward the end of the pull-in or pull-up movement of armature 5. The prior art has proposed electronic field coil energization circuits with which it is possible to forcibly bring about a complete permeation of the armature 5, during the pull-up or pull-in movement thereof, through extremely high exciting currents; however, such prior art means of achieving complete permeation of the armature also results in enormous eddy current losses amounting to a multiple of the mechanical work gain. The high eddy current losses, in turn, cause unacceptable temperature increases of the magnet system. Generally, in the prior art structures, the eddy current losses represent the main cause of loss in the force available for, and velocity of, the pull-in or pull-up movement of the armature.

Even though, as taught by the prior art, it may be possible to forcibly permeate the armature and thereby attain a sufficiently rapid pull-in of the armature, such does not hold true for the resetting (return to its normal de-energized state) movement of the armature means. That is, since considerable time usually elapses between the energization and de-energization of the field coil 4, the magnetic circuit is usually completely permeated before the energization current is terminated. After termination of such energizing current, the magnetic field is maintained for a while by the eddy currents and as a consequence thereof the resetting of the armature means is delayed. The reset delay can be reduced by an enlarged air gap as between armature 5 and pole piece 3 or by increasing the pre-load of the spring means 2; however, by doing so the energy consumption of the electromagnet is increased and the velocity of the pull-in of the armature means 5 is decreased.

The prior art magnetic circuit of the electromagnet system as depicted in FIG. 1 requires a dimensionally precise armature suspension because even slight eccentricities of the armature result in strong transverse magnetic forces. Such eccentricities produce an irregular flux distribution in the residual or radial air gap as between the armature 5 and housing 1 Since the magnetic force increases quadratically with the flux density, excessively increased transverse magnetic forces will result with even comparatively small asymmetries. Such transverse magnetic forces can be reduced by having relatively large air gap cross-sections and the resulting diminished induction; however, in order to compensate for such the armature length and, therefore, the armature mass increases. By saturation of the magnetic circuit the transverse magnetic forces can be eliminated; however, during the pull-in phase of operation such is prevented by the eddy currents.

The prior art magnetic circuit of the magnetic system of FIG. 1 has a relatively short armature means 5 in order to minimize the armature mass to be accelerated and thereby achieve relatively short times for the total movement thereof. However, in the embodiment as typically illustrated in FIG. 1, a short armature results in an unfavorable magnetic field distribution which, because of the small air gaps, already has a large portion of the lines of magnetic flux not passing through the armature and therefore makes no contribution to the generation of a force. The leakage field increases the energy requirement of the electromagnet and, in turn, the energy stored in the leakage field requires an increase in the decaying of the power upon de-energization of the actuating current.

Especially with regard to fuel injection valve assemblies, employing electromagnets, the prior art has proposed the use of a ball which serves both as an armature and a valve closing body. The mass of the ball being small, short actuating times could theoretically be expected. However, because of the unfavorable magnetic circuit form of a ball, such prior art ball valve-armature electromagnets have enormously large leakage losses causing, in turn, very high energy losses. Further, in order to obtain sufficient flow area, the stroke (movement) of the ball valve-armature must be increased as compared to flat seat valves and since the ball valve-armature has unfavorable bounce (cushioning) characteristics, no significant improvement in the overall dynamics is achieved by using a ball valve-armature as compared to the valve as depicted in FIG. 1.

The transitional behavior of electromagnets can be improved by a double working air gap. Such electromagnets are known, for example, as flat armature electromagnets wherein the armature is comprised of a thin disk. In comparison to other prior art electromagnets, for an equal maximum magnetic force, the total length of the working air gap is doubled while the areas of the pole faces are cut in half. In the ideal case, for the same field coil data and therefore an equal holding current requirement, the rate of energizing current rise in the coil can be quadrupled and the time for complete magnetic force buildup reduced by half. However, the halving of the pole faces with simultaneous doubling of the working air gap length increases the reluctance of the magnetic circuit. An increase in reluctance, in turn, always results in an increase of the field leakage factor. In the case of electromagnets employing flat armatures, the theoretical gain (in the rate of energizing current rise and reduction in time for complete force buildup) is to a great extent nullified by an enormously high leakage factor.

Further, flat armature electromagnets have extremely critical pull-in characteristics. For example, a slightly oblique relative position of the armature results in excessively increasing lateral forces which, in combination with the low inertia of the armature, set high demands for the armature suspension or lead to very unstable armature movement patterns.

In some applications of fuel injection valves for internal combustion engines especially where the fuel to be injected is under a very high pressure, electromagnets with sawtooth-like shaped armatures and cores are employed along with several simultaneously energizable field coils. In such an arrangement low eddy current magnetic circuits are experienced with light armatures which, at high magnetic forces, permit rapid actuation. However, because the air gap area distributed over several magnetic circuits is small in relation to the armature stroke, such electromagnets have high leakage factors. Further, in static operation the electrical energy consumption is increased, as compared to magnetic circuits with only one field coil, by the number of field coils. This is attributable to the fact that the electrical energization required for a given induction depends primarily only on the length and not the surface area of the working air gap. Due to the generally poor energy efficiency of such an electromagnet the required energization currents, which are extremely high anyway, are additionally increased under direct operation from the 12-volt power supply of a motor vehicle.

Accordingly, the invention as herein disclosed and described is directed primarily to the solution of such and other related and attendant problems of the prior art.

SUMMARY OF THE INVENTION

According to one aspect of the invention, an electromagnetically actuated fluid valving assembly comprises electrically energizable coil means, stator means, armature means, said coil means being operatively held against movement relative to said stator means, wherein said stator means and said armature means define an operatively closed loop magnetic circuit upon energization of said coil means, wherein said stator means comprises stator body means, wherein said armature means comprises armature body means, a central axis extending through said stator body means and said armature body means, wherein said stator body means is substantially symmetrical about said central axis, wherein said armature body means is substantially symmetrical about said central axis, wherein said stator body means and said armature body means comprise wall means effectively embracing at least a major portion of said coil means, wherein at least a portion of said wall means is of thin wall and of tubular configuration, a first working air gap existing between first and second juxtaposed portions of said stator body means and said armature body means respectively, and a second working air gap existing between third and fourth juxtaposed portions of said stator body means and said armature body means, wherein said first air gap is generally circular and lies in a first general plane extending transversely to said central axis, wherein said second air gap is generally circular and lies in a second general plane extending transversely to said central axis, wherein the radius of said first circular air gap as measured from said central axis is substantially greater than the radius of said second circular air gap as also measured from said central axis, wherein said first and second general planes are spaced from each other along said central axis, wherein said first and second juxtaposed portions respectively define first and second magnetically effective areas, wherein said third and fourth juxtaposed portions respectively define third and fourth magnetically effective areas, and wherein said first and second magnetically effective areas are approximately equal to said third and fourth magnetically effective areas.

According to another aspect of the invention, an electromagnetically actuated fluid valving assembly comprises electrically energizable coil means, stator means, armature means, said coil means being operatively held against movement relative to said stator means, wherein said stator means and said armature means define an operatively closed loop magnetic circuit upon energization of said coil means, wherein said stator means comprises stator body means, wherein said armature means comprises armature body means, a central axis extending through said stator body means and said armature body means, wherein said stator body means is substantially symmetrical about said central axis, wherein said armature body means is substantially symmetrical about said central axis, wherein said stator body means and said armature body means comprise wall means effectively embracing at least a major portion of said coil means, wherein at least a portion of said wall means is of thin wall and of tubular configuration, a first working air gap existing between first and second juxtaposed portions of said stator body means and said armature body means respectively, and a second working air gap existing between third and fourth juxtaposed portions of said stator body means and said armature body means, wherein said first air gap is generally circular and lies in a first general plane extending transversely to said central axis, wherein said second air gap is generally circular and lies in a second general plane extending transversely to said central axis, wherein the radius of said first circular air gap as measured from said central axis is substantially greater than the radius of said second circular air gap as also measured from said central axis, wherein said first and second general planes are spaced from each other along said central axis, wherein said first and second juxtaposed portions respectively define first and second magnetically effective areas, wherein said third and fourth juxtaposed portions respectively define third and fourth magnetically effective areas, wherein said first and second magnetically effective areas are approximately equal to said third and fourth magnetically effective areas, and a thin walled guide tube carried by said armature body means for movement in unison therewith.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted:

FIGS. 3a and 3b are each axial cross-sectional views respectively illustrating a magnetic circuit structure employing teachings of the invention and particularly suited for actuation of high fuel pressure injection valve assemblies and wherein the structure of FIG. 3b is fabricated from several elements as compared to that of FIG. 3a;

DETAILED DESCRIPTION OF THE PREFERRED EMBODIMENTS

Referring in greater detail to the drawings, FIGS. 2a, 2b, 2c and 2d illustrate some magnetic circuit forms which are effective for the actuation of fuel injection valves for internal combustion engines as well as for the actuation of valves in general hydraulics. In all of such embodiments the electromagnets have low eddy current losses due to thin walls on all sides. Because of the thin-wall design the poles have relatively sharp edges and such sharp edges, in turn, produce induction peaks which bring about an increase in magnetic force. Further, the arrangement of the air gaps results in a transverse or lateral force-free design with a low leakage factor and a rapid response time.

Figure 2A:
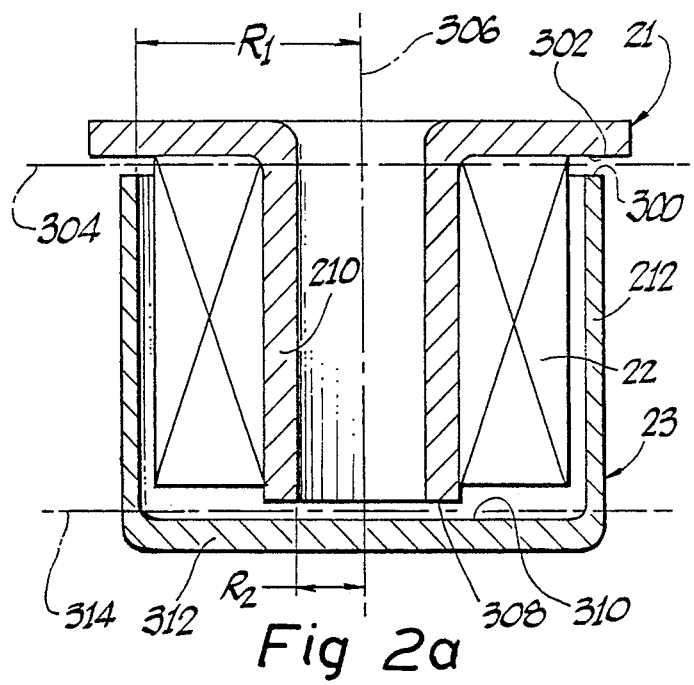
FIGS. 2a and 2b, 2c and 2d respectively illustrate, in axial cross-section various embodiments of a stator, field coil and armature embodying teachings of the invention.

More particularly, FIG. 2a illustrates a magnetic circuit structure which is especially suited for use in actuation of fuel injection valves for internal combustion engines. In the embodiment of FIG. 2a the core 210 of the stator 21 is cylindrically tubular and within such stator core 210 there is enough space for additional inserts such as, for example, spring means or other desired elements. The stator core 210 and armature 23, of cup-like configuration, are made to be as thin-walled as possible to thereby reduce and minimize eddy current losses. Such a thin-walled embodiment of the magnetic circuit permits, in an almost ideal manner, the manufacture thereof by a deep drawing process. Further, since little material is needed, a high-grade of magnet material may be used without resulting in an excessive cost.

As shown in FIG. 2a, the armature 23 is of a cup-shaped configuration having a cylindrical wall 212 with the annular axial end surface 300 thereof being juxtaposed as to an annular axially spaced surface 302 of the stator 21. A first working air gap is generally defined by such juxtaposed spaced surfaces 300 and 302. More particularly, such first working air gap could be considered as being a cylindrical ring forming an imaginary axial extension of the wall 212 with the radial thickness of such axial extension being equivalent to the axial projection of the end surface 300. Such an imaginary axial extension would extend to the juxtaposed cooperating surface 302 of the stator 21. Further, such an imaginary axial extension may be considered, when thusly extending to the surface 302, as establishing an imprint-like generally equivalent area on surface 302 which may be termed a first juxtaposed portion defining a first magnetically effective area while the end surface 300 of the armature 23 may be termed as a second juxtaposed portion defining a second magnetically effective area. The plane of such first air gap, depicted as by a mid plane line 304, is transverse to the central axis 306 and preferably normal thereto. The radius of such first circular air gap, measured as from axis 306 to what is depicted as effectively being the inner diameter of the first air gap, is depicted by the dimension, $R_1$.

Further, as shown in FIG. 2a, the core 210 of the stator means 21 is shown as terminating in a tubular cylindrical end portion having an annular axial end surface 308 thereof being juxtaposed as to an axial end surface 310 of the end wall means 312 of the cup-shaped armature 23. A second working air gap is generally defined by such juxtaposed spaced surfaces 308 and 310. More particularly such second working air gap could be considered as being a cylindrical ring forming an imaginary axial extension of the tubular cylindrical end of core 210 with the radial thickness of such axial extension being equivalent to the axial projection of the end surface 308. Such an imaginary axial extension would extend to the juxtaposed cooperating surface 310 of the armature 23. Further, such an imaginary axial extension may be considered, when thusly extending to the surface 310, as establishing an imprint-like generally equivalent area on surface 310 which may be termed a fourth juxtaposed portion defining a fourth magnetically effective area while the end surface 308 of the stator core 210 may be termed as a third juxtaposed portion defining a third magnetically effective area. The plane of such second working air gap, depicted as by a mid-plane line 314 is transverse to the central axis 306 and preferably normal thereto. The radius of such second circular air gap, measured as from axis 306 to what is depicted as effectively being the inner diameter of the second air gap, is depicted by the dimension, $R_2$.

The dynamic behavior of the armature 23 is determined primarily by the ratio of the working air gap area to armature mass. The relatively long side wall 212 of the armature 23 would at first seem to be in contradiction with the requirement of minimal armature mass. However, closer consideration shows that because of the double working air gap as compared with the prior art magnetic circuit structure of FIG. 1, at equal magnetic force, the cross-sectional or projected area of the air gap of the magnetic circuit in FIG. 1 can be cut in half. Because of the low eddy current losses, the armature of the invention is completely permeated during the pull-in process making a further magnetic circuit cross-sectional or projected area reduction possible. Also, the coil 22 dimensions can be reduced because of the lower current losses and, consequently, the total dimensions of the magnet system are substantially reduced as compared to prior art embodiments. As a result of this, for an equal magnet force, the invention provides an armature mass considerably less than that of the prior art armature and valve mass as depicted in the injection valve assembly of FIG. 1.

The form or configuration of the armature according to the invention permits its simple mounting directly in the associated valve housing which would be comprised of non-magnetizable material Further, the armature of the invention is capable of, for example, having mounted thereto and carrying functional components of the associated fluid flow valve. The valve housing is preferably comprised of a light metal or alloy which may be hard-anodized as at the bearing points or areas to increase the electrical resistance at such points or areas and to improve the wear properties thereof. Also, the armature of the invention may be provided, as at it bearing points and those areas thereof associated with cooperating environmental sructure or elements, with wear-resistant or damping coatings which should have an electrical resistance of a magnitude as high as possible. However, often an additional coating may be dispensed with because of the low pressure at the bearing points and because of the relatively soft or subdued movement experienced by the armature at those areas thereof associated with cooperating environmental structure or elements.

Due to its high inertia, the armature 23 of the invention has little tendency to tilt and the movement conditions or charcteristics thereof are stabilized. A damping of the armature movement can be achieved in a simple manner as by the formation therein of pressure compensation holes. The thin walls of the armature and core of the invention permit a rapid pressure equalization in the working air gaps resulting in the avoidance of hydraulic sticking of the armature Adhesion forces can be further reduced as by roughing of surfaces of the pole faces.

The residual air gap of the magnet system of the invention is arranged preferably between the outer poles. Consequently, uneven force distribution, which occurs if the armature is slightly askew, has less effect. The uneven force distribution is evened-out by the air gap so that the stronger interference forces then occur under the central pole where such forces cause the least interference moment. Furthermore, it is advantageous to narrow the pole cross-sections in the region of the air gaps in order to thereby achieve an increase in flux density and therefore a greater force. By so narrowing or constricting the pole cross-sections a saturation of the magnet material in the region of the air gaps is achieved and therefore an irregular force distribution no longer occurs even if the armature is askew.

The magnet system of the invention is dimensioned or calculated so that a sufficient eddy current depletion occurs at an appropriate armature suspension. The dimensioning or calculations are carried out by first determining the required working air gap cross-section which would be able to supply the required maximum magnetic force at a condition just below saturation induction in the air gap. The thusly determined required working air gap cross-section is then distributed equally (50% each) over the inner and outer poles so that approximately the same induction exists in both air gaps. The cross-section of the unconstricted portion of the magnet circuit is chosen to be of a size such that, giving consideration to the leakage field, the saturation induction is not attained; however, such is done without unnecessarily increasing the cross-section of the unconstricted portion. Therefter the wall thickness of the core is determined according to the required eddy current depletion so that during pull-in of the armature the core is permeated as completely as possible. The diameter of the core is determined by the required pole cross-section. The transverse cross-section of the coil 22 is chosen to be as small as possible, giving consideration to the permissible temperature rise thereof, in order to obtain a compact system and, therefore, a corresponding armature mass which is as small as possible. The ratio of coil height (or length) to coil width (or radial thickness) should be selected so that a sufficient armature height is available for the suspension and so that the wall thickness of the stator and armature are in a balanced ratio to thereby make the manufacture thereof as simple as possible. Usually, favorable dimensions obtain if the wall thickness of the inner pole is approximately about twice the wall thickness of the outer pole. Even though the ratio of coil height to coil width is in the most part non-critical, it should be noted that very elongated coils increase the leakage factor and therefore should be avoided. For magnet systems with a very small armature stroke, a rapid force buildup with high forces at the beginning of the pull-in movement and employing simple spring systems and simple actuating circuits can be achieved by choosing the resetting force to be approximately at 40% to 50% of the saturation induction force of the magnet system at the beginning of the pull-in movement.

Figure 1:
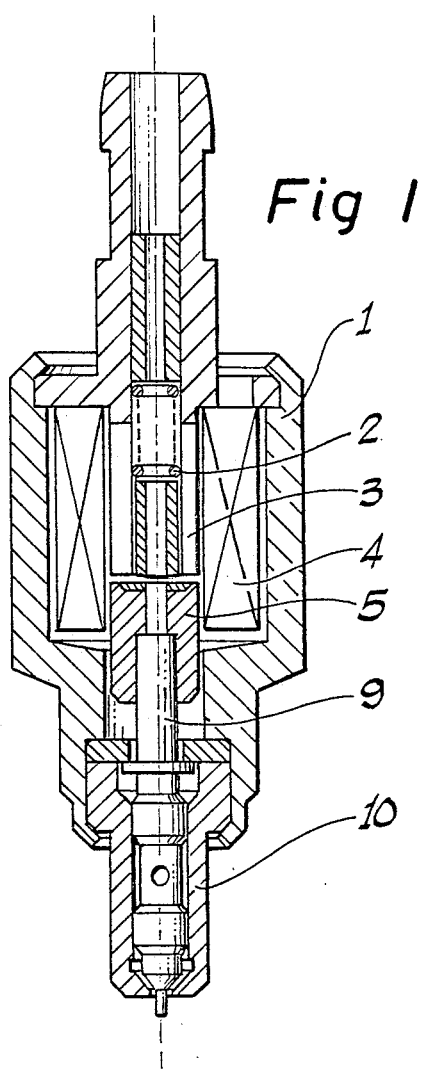
FIG. 1 is an axial cross-sectional view of a valving assembly having a prior art magnetic circuit.

Compared with the usual prior art electromagnets with a solid core and armature, as typified in FIG. 1, in the electromagnet of the invention, due to the large core diameter of the thin-walled magnetic circuit, the mean length of the respective coil turns and copper wire consumption increases and, therefore, at a given coil excitation, the electrical resistance of the coil also increases. However, this is of no great importance since the inductive component usually far exceeds the real component of the coil resistance during pull-in or upon a-c excitation and the additional ohmic energy loss is overcompensated by the strong reduction of the other loss sources.

The greatest part of the eddy current loss occurs in the core of the magnet system because the wall thickness thereof is greater than that of the outer pole and the current path is shorter because of the smaller diameter. The eddy current losses can be further reduced by lengthwise (or axial) slotting of the core.

Figure 2B:
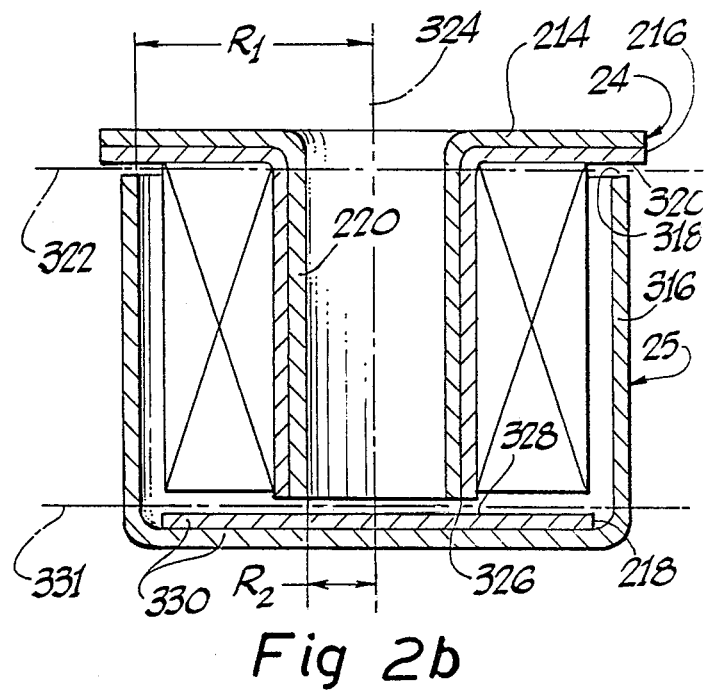

The embodiment of the invention in FIG. 2b illustrates a stator 24 as being comprised of two concentric electrically insulated parts 214, 216. The bottom of the armature 25 is provided with a second plate 218 fixedly secured therewithin resulting in a double magnetic circuit flux flow path in such area. The eddy current losses are further reduced as a consequence of, in effect, thusly subdividing of the magnetic circuit where such overall wall thickness has been effectively increased by the addition of such extra plates or thicknesses. The core 220 of parts 214, 216 (similarly to core 210 as shown in and described with reference to FIG. 2a) can be slotted in a longitudinal direction to permit the simple mounting and/or installation thereof and to further reduce the eddy current losses. The passage of the magnetic field lines between the insulated parts 214, 216 and 25, 218 is barely limited in the embodiment of the invention of FIG. 2b because the faces of the parts insulated from each other extend largely in the direction of the magnetic field lines.

As shown in FIG. 2b, the armature 25 is of cup-shaped configuration having a cylindrical wall 316 with the annular axial end surface 318 thereof being juxtaposed as to an annular axially spaced surface 320 of the stator 24. A first working air gap is generally defined by such juxtaposed spaced surfaces 318 and 320. More particularly, such first working air gap could be considered as being a cylindrical ring forming an imaginary axial extension of the wall 316 with the radial thickness of such axial extension being equivalent to the axial projection of the end surface 318. Such an imaginary axial extension would extend to the juxtaposed cooperating surface 320 of the stator 24. Further, such an imaginary axial extension may be considered, when thusly extending to the surface 320, as establishing an imprint-like generally equivalent area of surface 320 which may be termed a first juxtaposed portion defining a first magnetically effective area while the end surface 318 of the armature 25 may be termed as a second juxtaposed portion defining a second magnetically effective area. The plane of such first air gap, depicted as by a mid plane line 322, is transverse to the central axis 324 and preferably normal thereto. The radius of such first circular air gap, measured as from axis 324 to what is depicted as effectively being the inner diameter of the first air gap, is depicted by the dimension, $R_1$.

Further, as shown in FIG. 2b, the core 220 of the stator means 24 is shown as terminating in a tubular cylindrical end portion having an annular axial end surface 326 thereof (comprised as of the laminations 214 and 216) being juxtaposed as to an axial end surface 328 of the end plate 218 comprising a portion of the armature end wall means 330 of the cup-shaped armature 25. A second working air gap is generally defined by such juxtaposed spaced surfaces 326 and 328. More particularly such second working air gap could be considered as being a cylindrical ring forming an imaginary axial extension of the tubular cylindrical end of core 220 with the radial thickness of such axial extension being equivalent to the axial projection of the end surface 326. Such an imaginary axial extension would extend to the juxtaposed cooperating surface 328 of the armature 2. Further, such an imaginary axial extension may be considered, when thusly extending to the surface 328, as establishing an imprint-like generally equivalent area on surface 328 which may be termed a fourth juxtaposed portion defining a fourth magnetically effective area while the end surface 326 of the stator core 220 may be termed as a third juxtaposed portion defining a third magnetically effective area. The plane of such second working air gap, depicted as by a mid-plane line 332 is transverse to the central axis 324 and preferably normal thereto. The radius of such second circular air gap, measured as from axis 324 to what is depicted as effectively being the inner diameter of the second air gap, is depicted by the dimension, $R_2$.

A modification of the embodiment of FIG. 2b can be employed to improve the prior art a-c excited electromagnets for the actuation of hydraulic valves with solid cylindrical fluid-swept armature. That is, if the armature and core of the magnet are assembled from several concentric tubular parts there results a mechanically stable low loss magnetic circuit in which the greatest eddy current losses in the interior part of the magnet are greatly reduced. The electric insulation of the individual parts can be achieved by the use of layers of intermediate insulating material, by application of insulating coatings, by oxidizing the magnet material, by undercutting a large portion of the adjacent areas or by applying bulge type thickenings. Slotting of the parts in a longitudinal direction brings about a further reduction of the eddy current losses and facilitates the mounting thereof as generally described with reference to FIG. 2a. Joining of the individual parts can be effected preferably by cementing, sealing or attachment by sawtooth-shaped thickenings. A sturdy and easy to mount design is achieved if the outer portion of the armature is not slotted and the slotted tubular inner parts are slipped into the latter.

The electromagnets of the invention hereinbefore described are mechanically stable, low in eddy current and with respect to the field leakage losses, superior to at least most of the magnetic circuits of the prior art electromagnets.

Figure 2C:
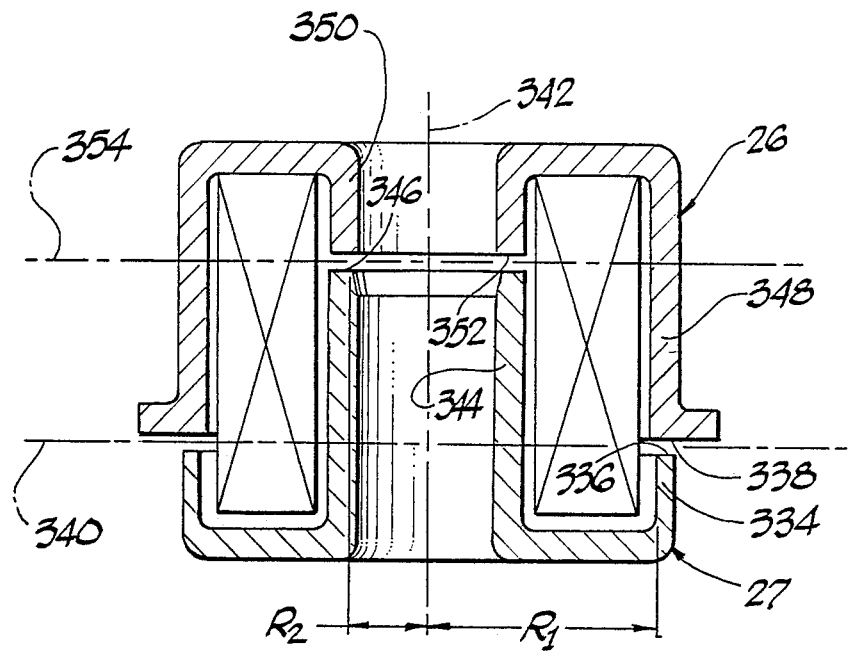

The least leakage field occurs, in particular at saturation of the magnet material, when the two air gaps are arranged so that they are not in the same plane and when respective portions of the stator and armature each cover the active part of coil by one fourth of coil length. Such a low leakage field magnet system is illustrated in FIG. 2c. The intensity of the leakage field depends, among other things, upon the reluctance of the air gaps. Because of the more complicated construction of the embodiment of FIG. 2c, such an embodiment would probably be employed mainly in those situations where the air gaps are of lengths which are relatively great relative to the cross-section of the magnetic circuit or for extreme requirements of leakage field depletion.

As shown in FIG. 2c, the armature 27 is somewhat of cup-shaped configuration having an outer cylindrical relatively thin wall 334 with the annular axial end surface 336 thereof being juxtaposed as to an annular axially spaced surface 338 of the stator 26. A working air gap is generally defined by such juxtaposed spaced surfaces 336 and 338. More particularly, such working air gap could be considered as being a cylindrical ring forming an imaginary axial extension of the wall 334 with the radial thickness of such axial extension being equivalent to the axial projection of the end surface 336. Such an imaginary axial extension would extend to the juxtaposed cooperating surface 338 of the stator 26. Further, such an imaginary axial extension may be considered, when thusly extending to the surface 338, as establishing an imprint-like generally equivalent area on surface 338 which may be termed a juxtaposed portion defining a magnetically effective area while the end surface 336 of the armature 27 may be considered as another juxtaposed portion defining an other magnetically effective area. The plane of such air gap (as herein described as existing between spaced juxtaposed surfaced 336 and 338), depicted as by a mid-plane line 340, is transverse to the central axis 342 and preferably normal thereto. The radius of such circular air gap, measured as from axis 342 to what is depicted as effectively being the inner diameter of the air gap, is depicted by the dimension, $R_1$.

The armature 27 has been referred to as being somewhat of cup like configuration in that the armature 27 has a centrally situated inner pole 344 which has a tubular cylindrical end portion with a circular annular end face or surface 346 carried thereby. The stator 26 has, as shown, an outer cylindrical wall 348 (on the end of which the previously described surface 338 is depicted) and a core 350 shown as terminating in a tubular cylindrical end portion having an annular axial end surface 352 thereof being juxtaposed as to the end face or surface 346 of armature pole 344. An other working air gap is generally defined by such juxtaposed spaced surfaces 346 and 352. More particularly such other working air gap could be considered as being a cylindrical ring forming an imaginary tubular cylindrical axial extension of the end surface 346 of armature pole 344 with the radial thickness of such axial extension being equivalent to the axial projection of such end surface 346. Such an imaginary axial extension would extend to the spaced juxtaposed cooperating surface 352 of the stator core 350. Further, such an imaginary axial extension may be considered, when thusly extending tot he surface 352, as establishing an imprint-like generally equivalent area on surface 352 which may be termed juxtaposed portion defining a magnetically effective area while the end surface 346 would be an other, cooperating, juxtaposed portion defining an other magnetically effective area. The plane of such working air gap (between juxtaposed surfaces 346 and 352), depicted as by a mid-plane line 354 is transverse to the central axis 342 and preferably normal thereto. The radius of such circular working air gap (between surfaces 346 and 352), measured as from axis 342 to what is depicted as effectively being the inner diameter of such air gap, is depicted by the dimension, $R_2$.

For a large armature stroke the outer pole of the armature 27 of the magnet system according to FIG. 2c moves out of the coil zone while the inner pole of the armature moves toward the coil center. Such an arrangement results in a favorable compromise with respect to the leakage field depletion in that the magnet system is formed so that with the armature pulled-in, one pole of the armature covers the coil entirely and the other pole of the armature only partly covers the coil.

Figure 2D:
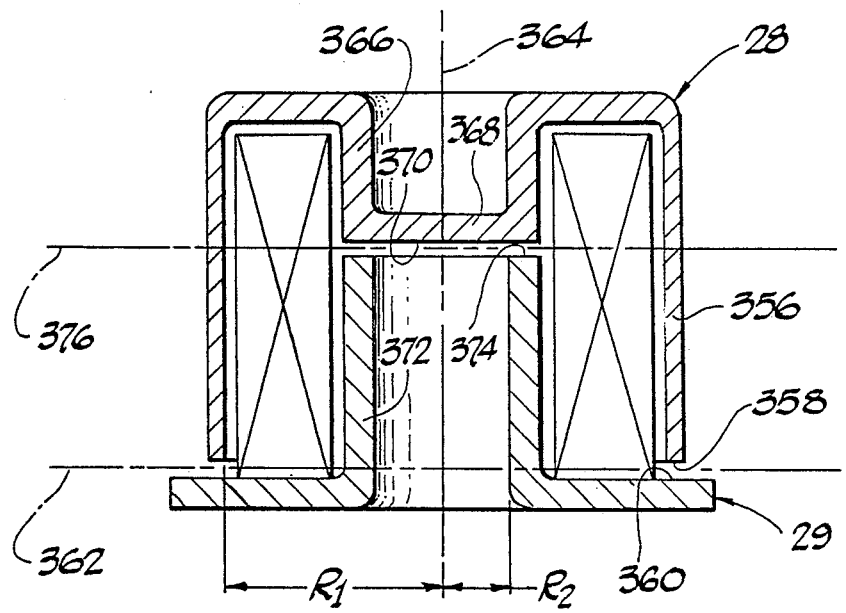

FIG. 2d illustrates a magnet system wherein, with the armature 28 in its released or re-set state, the center lines of the air gaps extend at a level or distance of about one fourth the active coil length. Although not so limited, the embodiment of FIG. 2d is particularly suited to use in actuation of slide valves in general hydraulics.

As shown in FIG. 2d, the armature 28 is of a somewhat cup-shaped configuration having a relatively thin cylindrical wall 356 with the annular axial end surface 358 thereof being juxtaposed as to an annular axially spaced surface 360 of the stator 29. A first working air gap is generally defined by such juxtaposed spaced surfaces 358 and 360. More particularly, such first working air gap could be considered as being a cylindrical ring forming an imaginary axial extension of the wall 356 with the radial thickness of such axial extension being equivalent tot he axial projection of the end surface 358. Such an imaginary axial extension would extend to the juxtaposed cooperating surface 360 of the stator 29. Further, such an imaginary axial extension may be considered, when thusly extending to the surface 360, as establishing an imprint-like generally equivalent area on surface 360 which may be termed a first juxtaposed portion defining a first magnetically effective area while the end surface 358 of the armature 28 may be termed as a second juxtaposed portion defining a second magnetically effective area. The plane of such first working air gap, depicted as by a mid-plane line 362, is transverse to the central axis 364 and preferably normal thereto. The radius of such first circular working air gap, measured as from axis 364 to what is depicted as effectively being the inner diameter of the first air gap, is depicted by the dimension, $R_1$.

The armature 28 has been referred to as being somewhat of cup-like configuration in that the armature 28 has a centrally situated inner pole 366 which is of tubular cylindrical configuration terminating in an end wall 368 with an axial end face or surface 370 carried thereby. The stator means 29 is shown as having a core 372 terminating in a tubular cylindrical end portion having an annular axial end surface 374 thereof being juxtaposed as to the axial end surface 370 of the inner pole 366 of armature 28. A second working air gap is generally defined by such juxtaposed spaced surfaces 370 and 374. More particularly such second working air gap could be considered as being a cylindrical ring forming an imaginary axial extension of the tubular cylindrical end of core 372 with the radial thickness of such axial extension being equivalent to the axial projection of the end surface 374. Such an imaginary axial extension would extend to the juxtaposed cooperating surface 370 of the armature 28. Further, such an imaginary axial extension may be considered, when thusly extending to the surface 370, as establishing an imprint-like generally equivalent area on surface 370 which may be termed a fourth magnetically effective area while the end surface 374 of the stator core 372 may be termed as a third juxtaposed portion defining a third magnetically effective area. The plane of such a second working air gap, depicted as by a mid-plane line 376 is transverse to the central axis 364 and preferably normal thereto. The radius of such a second circular air gap, measured as from axis 364 to what is depicted as effectively being the inner diameter of the second air gap, is depicted by the dimension, $R_2$.

The magnetic circuits according to FIGS. 2a, 2b, 2c and 2d are especially suitable for injection valves for internal combustion engines wherein the fuel to be injected is in the relatively low and medium pressure range and for alternating current hydraulic magnets in which only moderate forces need to be generated.

Figure 3A:
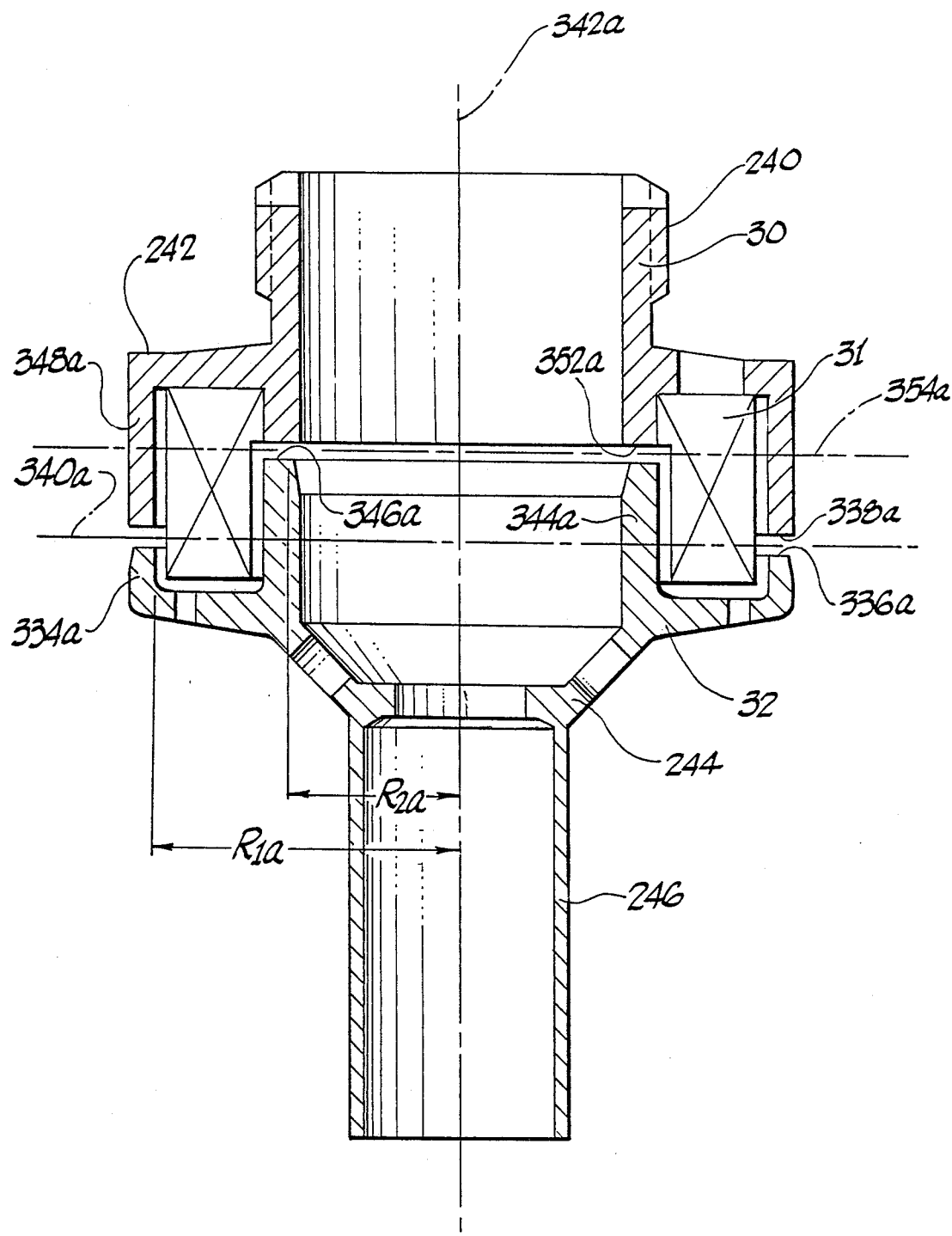
Figure 3B:
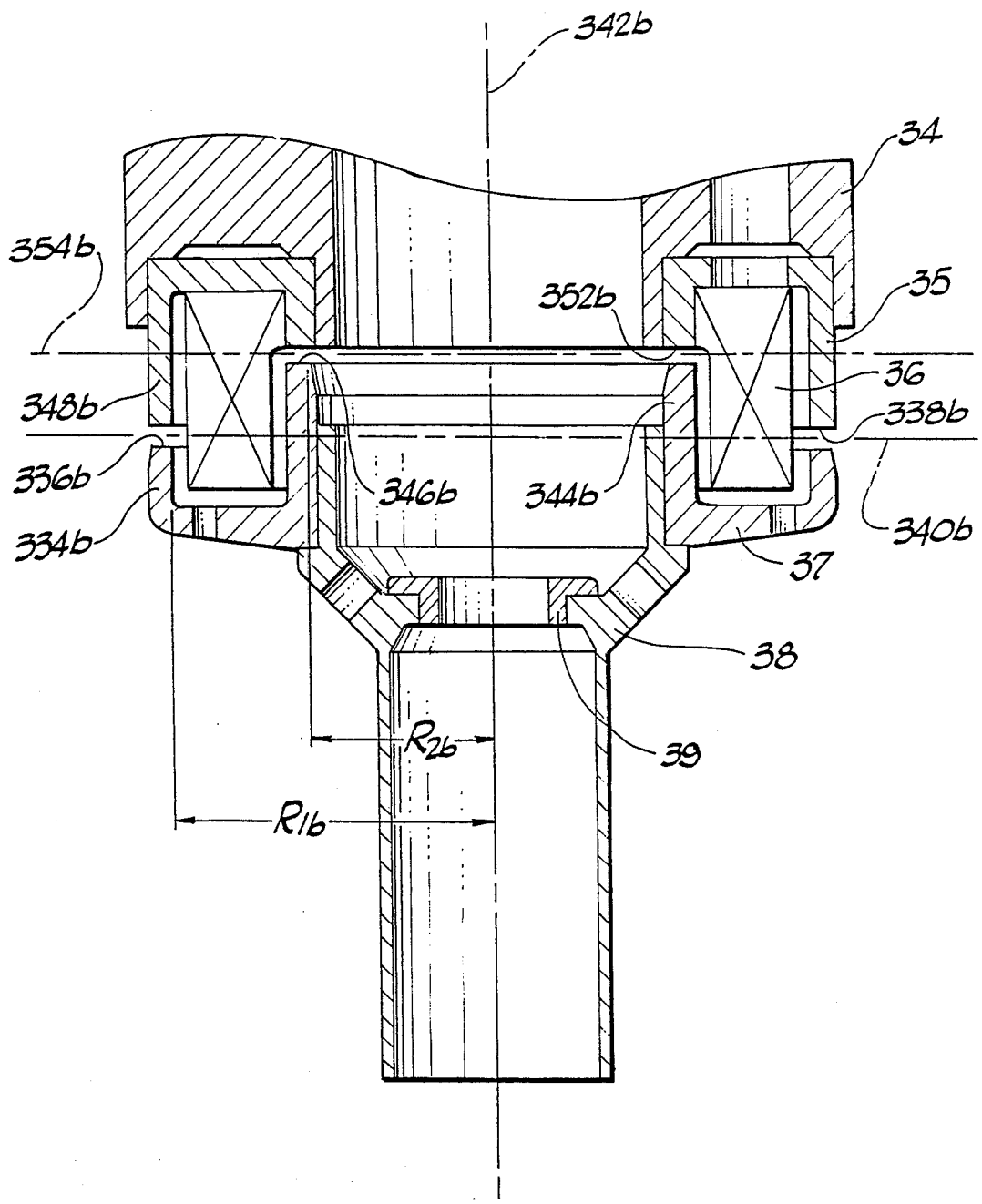

However, high fluid pressure injection valves require very high magnet forces at small armature stroke and in such situations only relatively small coils combined with large working air gap areas and, therefore, large central pole diameters are required. This results in either very elongated magnetic circuits with elongated coils, increased leakage losses and undesirably high armature mass or in an insufficient length of the armature suspension. Further, in such high fluid pressure injection valves where high magnet forces are required, mechanical deformations of the magnetic circuit, which reduce the residual air gap, have a noticeable effect. The embodiments of the invention as illustrated in FIGS. 3a and 3b provide further improvements which overcome such further problems or considerations with respect to high fluid pressure electromagnetically operated valve assemblies. Generally, in the embodiments of FIGS. 3a and 3b, the functions of armature suspension and generation of magnet force are separated.

Referring in greater detail to FIG. 3a, a magnetic circuit of the invention, similar to that of FIG. 2c, especially suited for use in high pressure fluid injection valve assemblies, is illustrated as comprising a stator 30, coil 31 and armature 32. The stator 30 may be threaded as at 240 and threadably engaged with the associated valve housing in such a manner as to have the outer shoulder 242 of the stator firmly abutted to the valve housing thereby preventing independent movement of the outer pole 348a of the stator 30. The magnet circuit possesses a compact coil 31 which is covered by the magnet poles over about one fourth the coil length, each, so as to obtain minimum leakage losses especially at saturation of the magnet material. Various elements in FIG. 3a are identified with reference numbers provided with a suffix, a; such functionally correspond to those elements of FIG. 2c identified with like reference numbers but lacking the suffix a. Further, the radius $R_{1a}$ functionally corresponds to radius $R_1$ of FIG. 2c and the radius $R_{2a}$ functionally corresponds to radius $R_2$ of FIG. 2c. Similarly, the mid-plane lines 340 and 354 of FIG. 2c find their respective counterparts in mid-plane lines 340a and 354a of FIG. 3a. The armature 32 is connected, as by a stable central section 244, to a long guide tube 246 for the armature 32 to be properly guided. The necessary eddy current depletion is achieved by a large inside diameter of the center pole and by thin walls on all sides. The wear resistance can be improved, as is generally well known, by applying coating materials on the bearing points and such other areas where the stator and/or armature are operatively connected to associated cooperating elements.

In order to obtain sufficiently high magnet forces at low armature weight, the magnetic circuit should consist of a material with highest possible saturation induction, high specific electric resistance and moderate permeability. Materials which have been found suitable are, for example, mainly sintered silicon iron and cobalt iron. Cobalt iron has the highest saturation induction but is relatively expensive and difficult to machine; therefore, especially when using cobalt iron it is desirable to limit the use of such materials to the necessary minimum amount.

FIG. 3b illustrates an embodiment of the invention in which the magnetic circuit, similar to that of FIG. 2c, is comprised of several parts in order to reduce the cost of the magnet material and the armature mass. The stator 35 of the magnetic circuit is cemented into the valve housing 34. The armature 37 is connected with the guide tube 38 which is preferably comprised of light metal and may be provided with wear-resistant coatings. The valve member, such as for example, a needle valve (not shown), is actuated by a wear-resistant intermediate member 39 which is firmly connected with the guide tube 38. Various elements in FIG. 3b are identified with reference numbers provided with a suffix, b; such functionally correspond to those elements of FIG. 2c identified with like reference numbers but lacking the suffix, b. Further, the radius $R_{1b}$ functionally corresponds to radius $R_1$ of FIG. 2c and the radius $R_{2b}$ functionally corresponds to radius $R_2$ of FIG. 2c. Similarly, the mid-plane lines 340 and 354 of FIG. 2c find their respective counterparts in mid-plane lines 340b and 354b of FIG. 3b.

The embodiments of the invention of FIGS. 3a and 3b have little armature mass and are superior to the prior art electromagnets used, for example, for high pressure fuel injection valve assemblies for internal combustion engines, with respect to electrical efficiency and simple construction of the magnet circuit. In the use of the invention for purposes of actuation of high pressure fuel injection valve assemblies, the arrangement of the air gaps is relatively non-critical because of the large air gap in proportion to the armature stroke provided, however, that the diameter of the inner pole is made sufficiently large in order to obtain the necessary eddy current depletion.

The highest magnet forces in proportion to the armature mass can be obtained with flat armature magnets although such is done with a considerably lower efficiency of the electrical energy conversion.

Figure 4A:
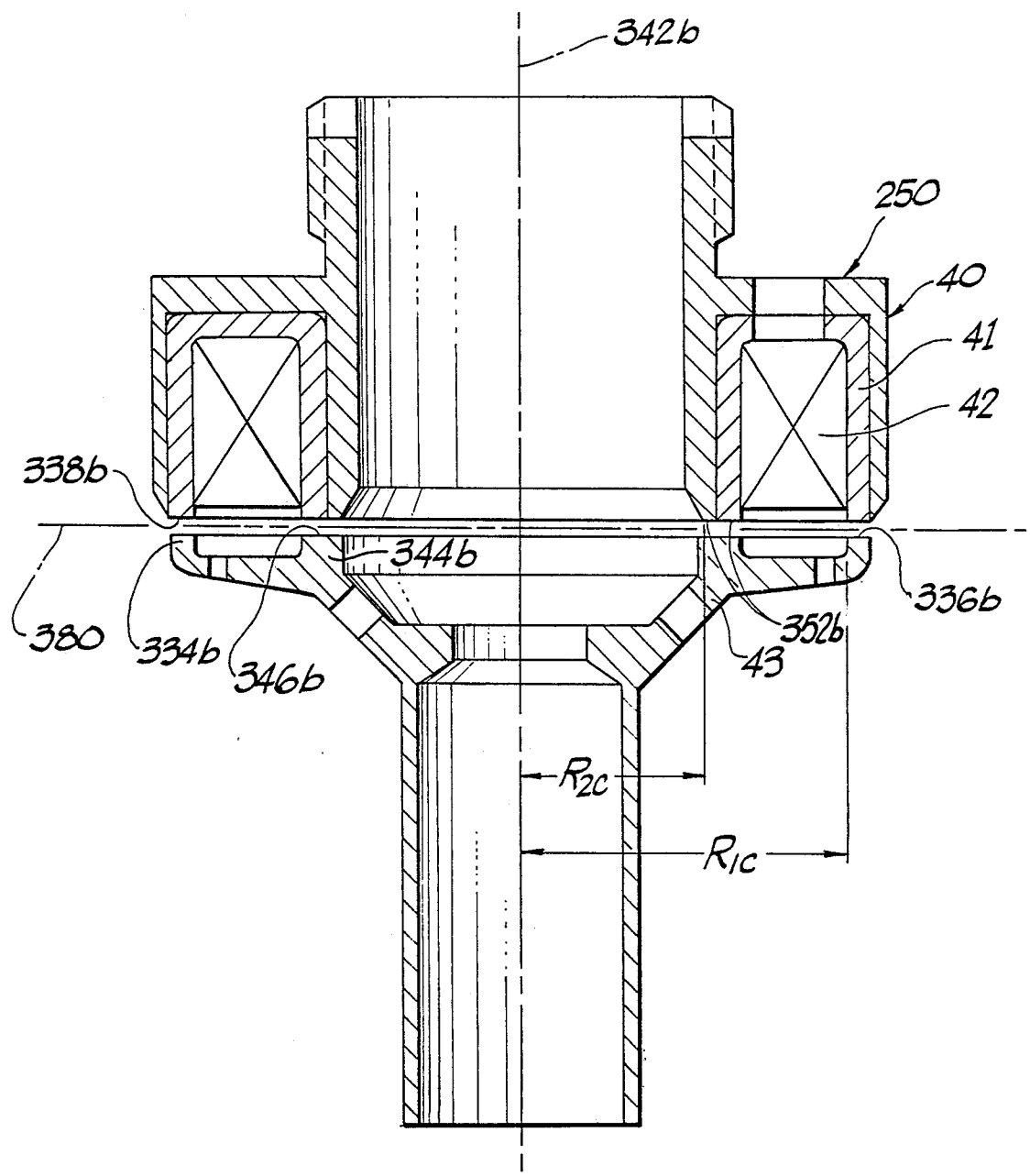
FIGS. 4a and 4b are each axial cross-sectional views respectively illustrating modifications of the invention.

FIG. 4a illustrates an embodiment of the invention employing a flat armature 43 wherein the magnet has a thin walled magnetic circuit of large inside diameter. Except as noted to the contrary, certain of those elements in FIG. 4a which generally functionally correspond, for example, to those of FIG. 3b are identified with like reference numbers and suffixes. Further, the radius $R_{1c}$ functionally corresponds to radius $R_1$ of FIG. 2c (or radius $R_{1b}$ of FIG. 3b) and radius $R_{2c}$ functionally corresponds to radius $R_2$ of FIG. 2c (or radius $R_{2b}$ of FIG. 3b). Similarly, the plane of the working air gaps of FIG. 4a is depicted as by mid-plane line 380. Because of the larger leakage field, in comparison to the embodiments of FIGS. 3a and 3b, the magnetic circuit cross-section is increased in the upper zone or portion of the stator 250. In order to obtain a sufficient eddy current depletion, the stator 250 of the magnetic circuit is comprised of two concentric parts 40 and 41 generally containing the electrically energizing coil means 42. Especially favorable results are obtained when the outer part 40 of the stator 250 is comprised of magnet material which is easy to machine and which has as high as possible specific electrical resistance while the easy to manufacture inner part 41 is formed of magnetically high-grade material and is fastened, in an electrically insulated manner as, for example, by cementing. It has been found that the use of silicon iron for the outer part and cobalt iron for the inner part of the stator is especially suitable.

Figure 4B:
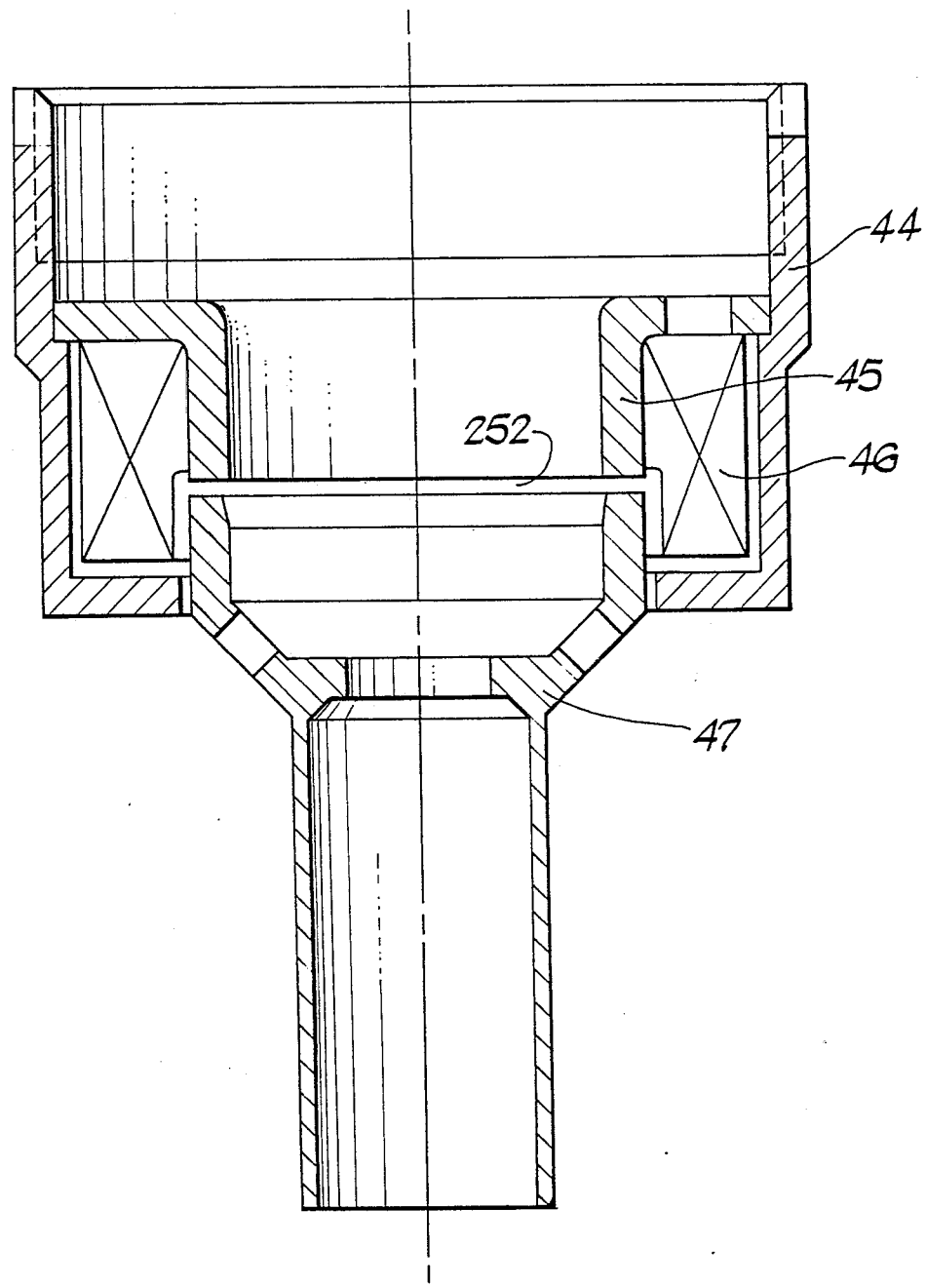

In theory thin walled magnetic circuits with a single-action working air gap and thin walled guide tube are also suitable for use as electromagnets for high pressure fuel injection valve assemblies. However, because of the initially described disadvantages of that particular form with a single-action air gap, such structures are somewhat less favorable. Such a magnetic circuit is illustrated in FIG. 4b wherein the magnetic circuit is comprised of a pole piece 45, magnetic housing 44, armature 47 and coil means 46. The magnet with single-action air gap 252 according to FIG. 4b and the flat armature magnet according to FIG. 4a has a special advantage which is the possibility of sealing the coil space containing coil means 42, from the working space of the armature by sealing elements of simple construction.

The following are some further examples of embodiments of the invention.

Figure 5:
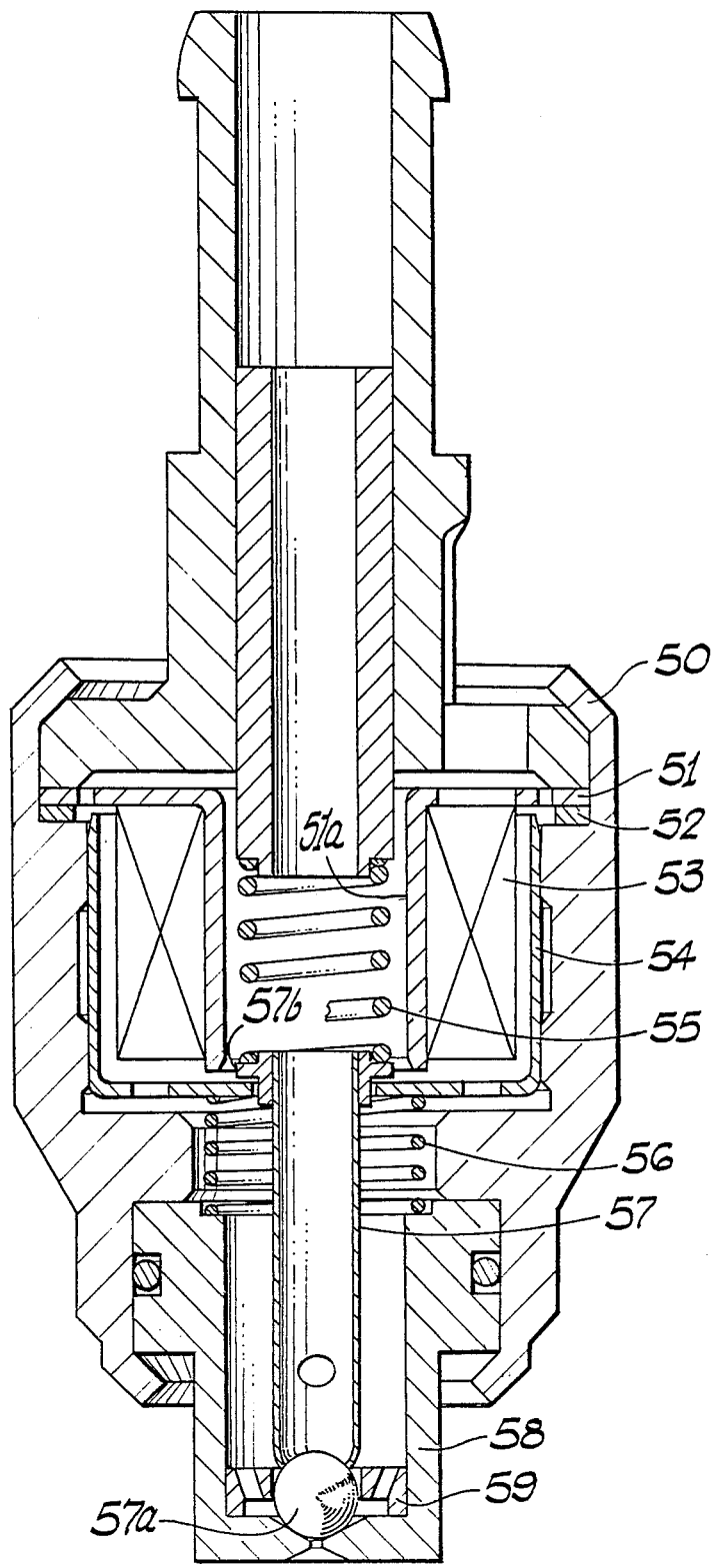
FIG. 5 is an axial cross-sectional view of an electromagnetic valving assembly employing teachings of the invention and particularly suited for injecting fuel into the induction passage of an internal combustion engine.

FIG. 5 illustrates a fuel injection valving assembly for use, for example, for injecting fuel into the induction passage of an internal combustion engine. The embodiment of FIG. 5 comprises a needle-like tubular member 57 which is guided for axial movement by the armature 54, with only slight radial clearance, and extends into lower housing portion 58 which carries affixed valve guide 59. The needle-like member 57 is self-centering so that expensive guides are obviated. A shim ring 52 makes it possible to adjust the valve stroke. The armature 54, circumferentially encompassing the coil means 53, is mounted in the housing 50 which, preferably, is comprised of light metal and may be hard-anodized at the bearing points to increase the wear resistance and the electric contact resistance.

As is evident, the stator 51, coil 53 and armature 54 of FIG. 5 are most like that disclosed in FIG. 2a.

For the reasons already mentioned, the residual air gap of the magnetic circuit is arranged between the end of the cylindrical wall of armature 54 and the axially juxtaposed portion of stator 51 which has a stator core 51a. At the bearing points and at the point of contact of the valve needle 57, the armature 54 may be provided with a wear-resistant coating, preferably applied by electroplating. The armature and valve needle 57, including the ball valve portion 57a and abutment collar 57b carried thereby, form a two-mass system which in conjunction with the restoring springs 55 and 56 can be matched so as to result in extremely little bounce. The valve may alternatively be equipped with various other known valve needles, for example, with valve needles which have pins at the lower end to improve the atomization or are provided with devices for generating a swirl. Similar models can be equipped with all types of known seat valves, in which the valve closing element has a conical, spherical or flat form.

In the embodiment illustrated with seat valve and with the electromagnet according to the invention is, for example, excellently suitable for the hydraulic control of anti-locking systems in motor vehicle brakes. In the prior art known magnet systems with little armature clearance for this purpose, the problem often arises that after prolonged non-use of the system the armature locks due to corrosion. In the lateral-force-free electromagnet according to the invention, this can easily be prevented by a corrosion-free coating of the armature or of the bearing points in the housing and by increased armature clearance or play. Besides, with the electromagnet according to the invention there results a dynamic behavior superior to the prior art known magnetic circuit forms.

Figure 6:
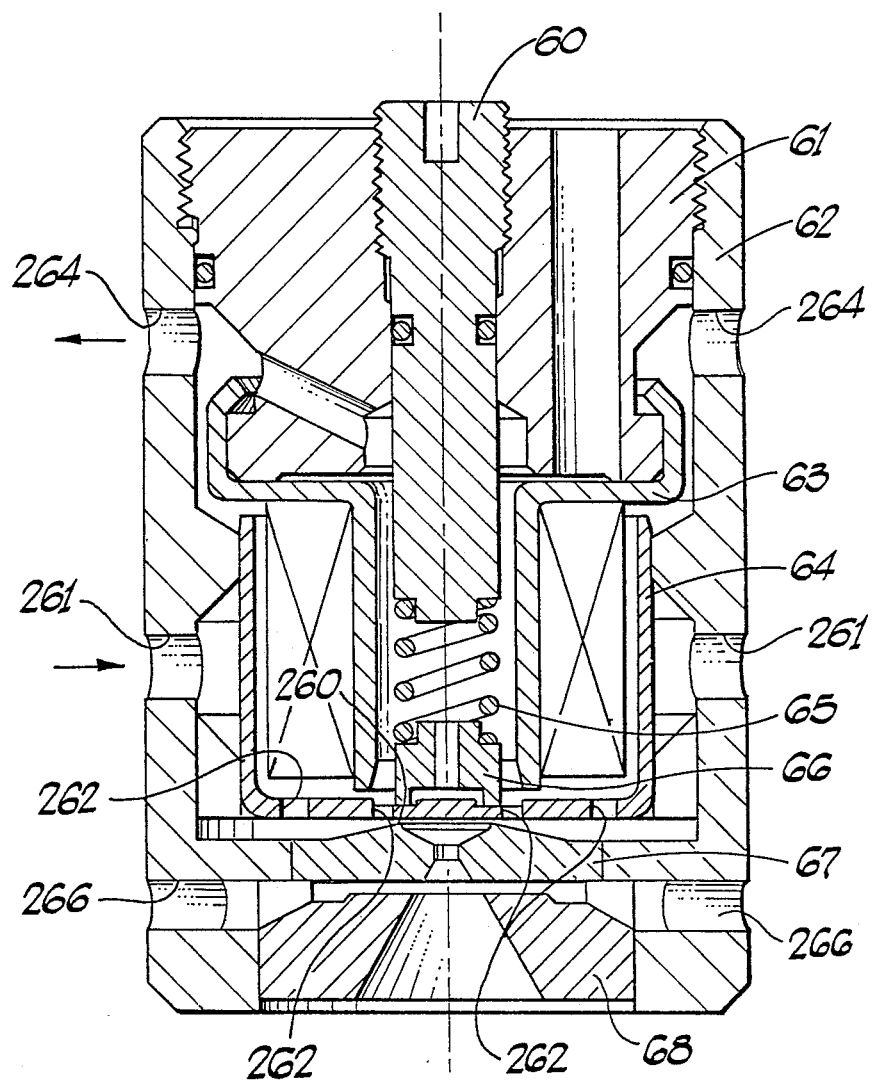
FIG. 6 is an axial cross-sectional view of an electromagnetic valving assembly employing teachings of the invention and particularly suited as for the central injection of fuel into the induction passage of an internal combustion engine.

FIG. 6 shows an injection valve assembly, as for central injection of fuel into the induction passage of an internal combustion engine, which uses a valve seat member 67 with a flat seat 260 for the control of the fuel flow. The intended purpose of use requires high fuel flow rates, which can be achieved with flat seat valves with minimum armature stroke. The stator 63 of the magnet is connected with the holding screw 61, which permits adjusting the stator position and hence the armature stroke. The armature 64 forms with the supplementary mass 66 a two-mass system for influencing the bounce and is reset by the force, adjustable with the screw 60, of the restoring spring 65. The valve housing 62 is continually flushed by fresh fuel, to suppress any vapor bubble formation and to permit satisfactory operation at lowest possible fuel pressures. The fuel is supplied, as through passages 261, between the upper and lower bearing points of the armature 64, resulting in an excellent fully fluid suspension of the armature. Through ports 262 in the armature the fuel is conducted to the return flow ports 264 in the housing, the flow at the valve seat being guided in the direction of the fuel passage, in order to obtain low whirling losses as the valve opens. The armature 64 rests directly on the valve seat body 67 and is provided at the abutment point with a wear-resistant coating. For better sealing it is possible also to provide the armature 64 with a well sealing plastic seal or the like at the point of abutment. Under the valve body is another nozzle body 68 which communicates with the outside air or with a compressed air source through an additional bore means or ports 266 in the housing 62 and supports the atomization of the fuel by supply of atomizing air. The atomization of the fuel can be further improved as by any known manner by generating a fuel swirl by swirl elements or tangential fuel supply.

As is evident, the stator 63, coil and armature 64 of FIG. 6 are most like that disclosed in FIG. 2a.

For electromagnetic injection valves which operate at low fuel pressures, low magnet forces are required for overcoming the hydraulic forces. Sufficient magnet forces can here be attained already with very small working air gap cross-sections which, as desired, increase the rate of current increase as the exciting current is connected, but on the other hand they increase the leakage losses because of the higher reluctance of the air gaps. In such cases it is desirable to use a magnetic circuit form of optimally low leakage field despite the increased manufacturing cost.

Figure 7:
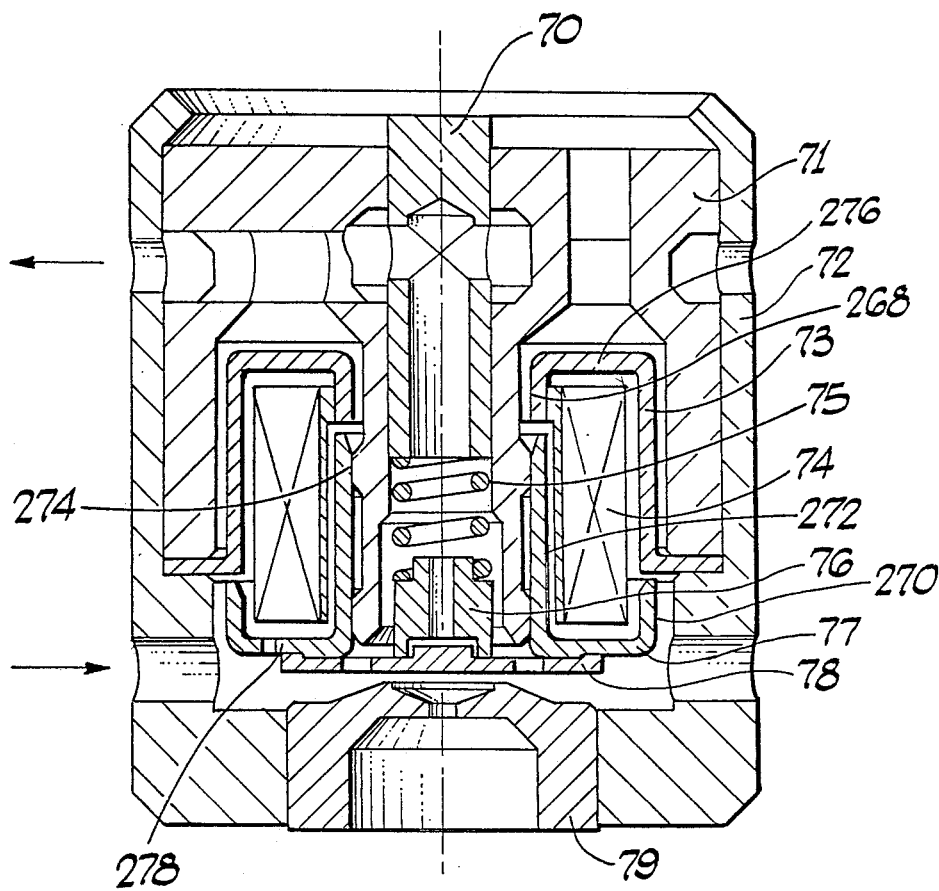
FIG. 7 is an axial cross-sectional view of a low-leakage field electromagnetic valving assembly employing teachings of the invention and suited, for example, for the injection of fuel into the induction passage of an internal combustion engine.

FIG. 7 shows such a low-leakage field injection valve assembly as for injection of fuel into the induction passage of an internal combustion engine. As has been explained before, the leakage field depletion is achieved in that the electrically active part of the coil 74 is covered by the shorter part of the two magnet poles 268 and 270 (of stator 73 and armature 77) one fourth of the coil length each. In the embodiment of FIG. 7, the center pole 272 of the armature 77 is mounted on a journal 274 of the inner housing part 71. The required working air gap cross-sections are exceedingly small, so that the permissible mechanical deformation determines the required cross-section of the magnetic circuit. The deformations occur almost exclusively in the membrane type upper part 276 of the stator 73 and in the lower part 278 of the armature 77. However, the deformations decrease extremely rapidly with the third power of the sheetmetal thickness, so that a slight increase of the sheet-metal thickness, which would be required on the basis of the magnetic flux, already brings about a sufficient stability.

As is evident, the stator 73, coil 74 and armature 77 of FIG. 7 are most like that disclosed in FIG. 2c.

At the dimensions in question, the slight increase in sheet thickness does not yet cause an inadmissible increase of the eddy current losses and it reduces the reluctance of the magnetic circuit The working air gap cross-sections are constricted to increase the air gap induction. The armature cross-section needs to be increased slightly only in the lower membrane type part 278, so that the armature mass increases but little. Connected with the armature is a plate type valve 78, which at the same time transmits the force of the restoring or re-setting spring 75 to the armature. To improve the bounce behavior and the proportioning accuracy, the movable supplementary mass 76 is disposed between the armature and restoring spring 75. The dynamics of the valve can be varied by adjusting the restoring spring force with the adjusting bolt 70. The valve housing is flushed with fresh fuel to prevent vapor bubble formation. The armature stroke is adjusted by moving the nozzle element 79. Here, too, the injection valve can be provided as in any known manner with devices for creating a fuel swirl and for supplying atomization air. Another embodiment of the invention may have the plate type valve 78 replaced by a thin-walled guide tube. The plate type end face of the guide tube, preferably made by deep drawing, serves as the valve. The guide tube serves at the same time for armature suspension and is arranged concentrically in the inner pole of the armature and is firmly connected therewith. The guide tube is preferably made of wear-resistant material, or it may consist of magnetizable material, to reduce the eddy current losses by division of the magnetic circuit.

Figure 8:
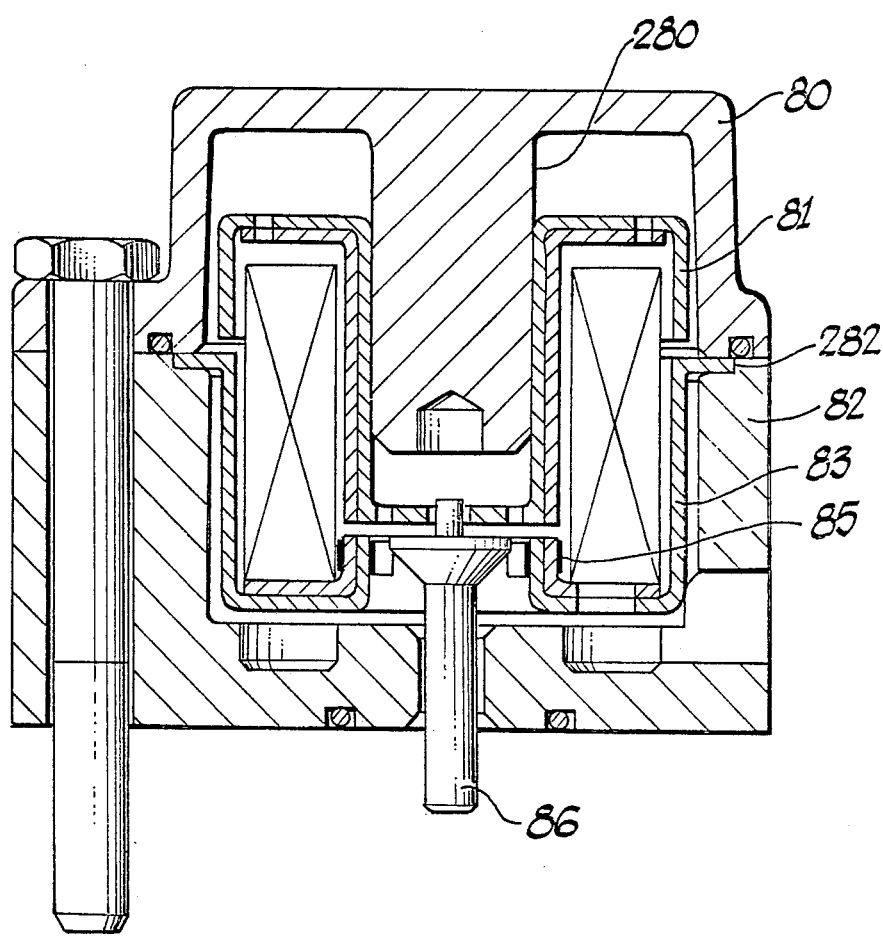
FIG. 8 is an axial cross-sectional view of an electromagnetic valving assembly employing teachings of the invention and particularly suited as for the actuation of slide valves in general hydraulics with an a-c excited electromagnet.

FIG. 8 shows an actuator as for the actuation of slide valves in general hydraulics with an a-c excited electromagnet. The actuator device is made pressure tight and is swept by hydraulic fluid. To obtain a high magnet force at the beginning of the pull-in movement and low leakage losses, the working air gaps of the magnetic circuit are arranged so that the center lines or midplanes of the working air gaps are, when the armature is released or reset, removed from the respective coil ends about one fourth the active coil length. The armature 81 and stator 83 of the magnetic circuit are each composed of two firmly connected concentric parts to reduce eddy current losses and to increase the cross-section. The stator 83 is provided with two symmetrically arranged shortcircuit rings 85, which in known manner embrace a part of the magnetic flux, in order to generate a magnet force under a-c operation also during zero crossing of the exciting current by phase shift of the embraced part of the magnetic flux. The armature 81 is mounted on a guide pin or sliding journal 280 of the upper housing part 80. The stator 83 of the magnet is provided with a collar or flange 282 which is clamped between the upper part 80 and lower part 82 of the housing. The magnet force is transmitted to the slide, not shown, of the hydraulic valve by the stud-like or stem-like member 86.

As is evident, the stator 83, coil and armature 81of FIG. 8 are much like, and employ the features of, the electromagnetic motor means of FIGS. 2c, 2d and 2b.

Figure 9:
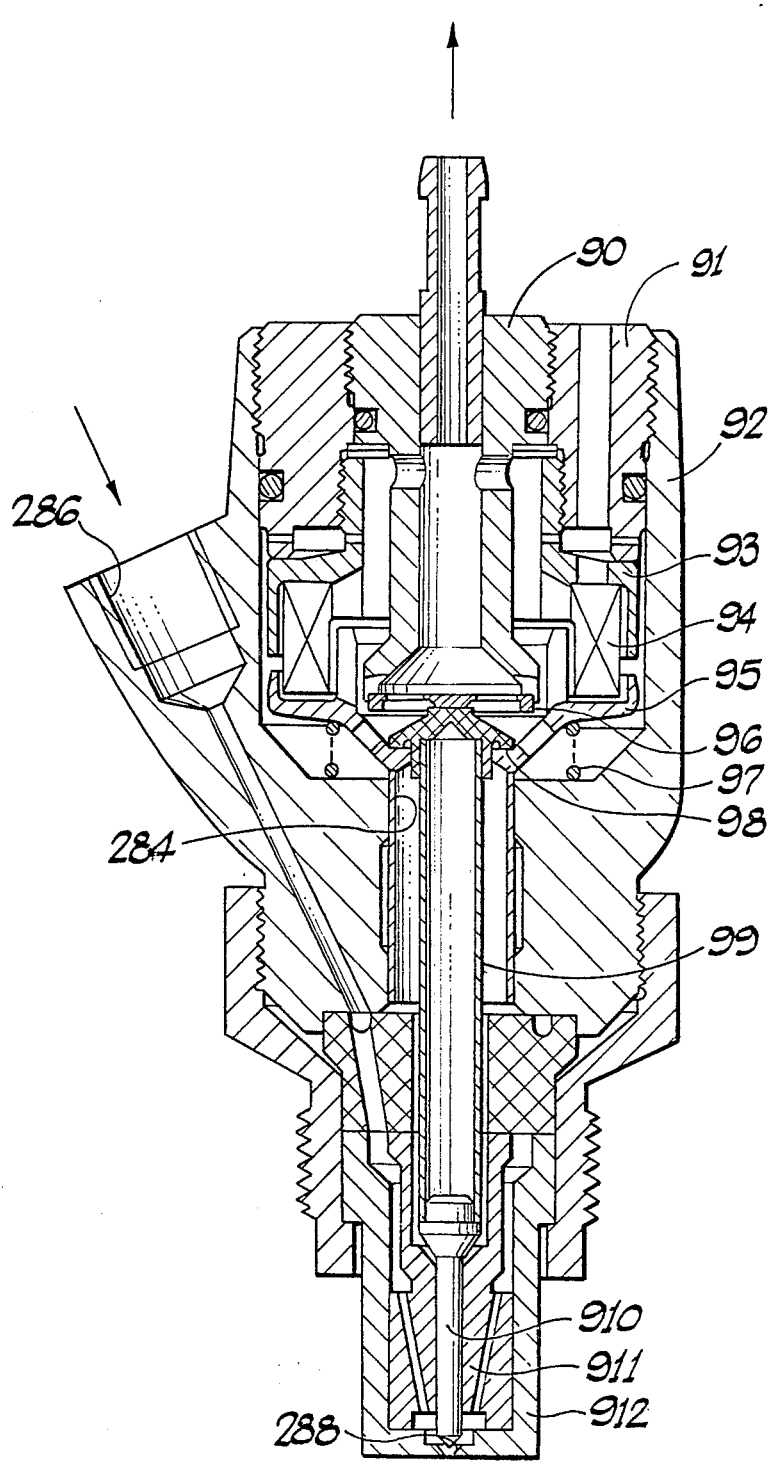
FIG. 9 is an axial cross-sectional view of an electromagnetic valving assembly employing teachings of the invention and suited, for example, for the direct injection of fuel into the combustion chamber of an internal combustion engine.

FIG. 9 shows an electromagnetic injection valve assembly as for direct injection of fuel into the combustion chamber of an internal combustion engine. The magnetic circuit has the form already illustrated in FIG. 3a. The stator 93 of the magnetic circuit is screwed to the support screw 91 and clamped on the outer shoulder, to completely suppress axial movements of the outer pole of the stator. With the support screw 91 the armature stroke and hence the stroke of the valve needle 910 is adjusted. Because of the large inside diameter of the armature 95, there is enough space to accommodate a membrane spring 96 which has a steep spring characteristic. The spring characteristic of the membrane spring 96 is rated so that there results a favorable movement pattern with a high magnet force excess at the beginning of the armature pull-in and a very small magnetic force surplus toward the end of the pull-in movement. The valve needle 910 is connected with the pressure or abutment piece 98 by the connection pipe or tube 99. The pressure or abutment piece 98 is mounted axially movable in the armature 95 with little clearance or play, so that the pressure or abutment piece 98 and the parts connected therewith form in cooperation with the armature 95 a two-mass system which, by selection of suitable mass and force ratios is adapted so that a minimum of bounce results. The static component of the spring force of the membrane spring 96 is adjusted with the adjusting screw 90. The material of the connecting pipe or tube 99 is selected so that the heat expansions of the individual parts balance each other out and the valve stroke remains constant to the extent possible in the entire operating temperatre range. The tubular part 284 of the armature 95 is rigidly guidingly mounted in and by the valve housing 92, which is comprised of non-magnetizable material. The fuel under optimally constant pressure is conducted through a port in the valve housing 92 and through a guide piece 911, fixedly carried within a lower housing or discharge portion 912, to the seat 288 of the valve formed as in 912. A small amount of fuel leakage passes through the gap between valve needle 910 and guide piece 911 into the valve housing 92 and is returned from there to the fuel tank at low pressure. The moving parts of the injection valve are lubricated by the backflowing fuel.

As is evident, the stator 93, coil 94 and armature 95 of FIG. 9 are most like that disclosed in FIG. 3a.

Although only a preferred embodiment and selected modifications of the invention have been disclosed and described, it is apparent that other embodiments and modifications of the invention are possible within the scope of the appended claims.

What is claimed is:

1. An electromagnetically actuated fluid valving assembly comprising electrically energizable coil means, stator means, armature means, said coil means being operatively held against movement relative to said stator means, wherein said stator means and said armature means define an operatively closed loop magnetic circuit upon energization of said coil means, wherein said stator means comprises stator body means, wherein said armature means comprises armature body means, a central axis extending through said stator body means and said armature body means, wherein said stator body means is substantially symmetrical about said central axis, wherein said armature body means is substantially symmetrical about said central axis, wherein said stator body means and said armature body means comprise wall means effectively embracing at least a major portion of said coil means, wherein at least a portion of said wall means is of thin wall and of tubular configuration, a first working air gap existing between first and second juxtaposed portions of said stator body means and said armature body means respectively, and a second working air gap existing between third and fourth juxtaposed portions of said stator body means and said armature body means, wherein said first air gap is generally circular and lies in a first general plane extending transversely to said central axis, wherein said second air gap is generally circular and lies in a second general plane extending transversely to said central axis, wherein the radius of said first circular air gap as measured from said central axis is substantially greater than the radius of said second circular air gap as also measured from said central axis, wherein said first and second general planes are spaced from each other along said central axis, wherein said first and second juxtaposed portions respectively define first and second magnetically effective areas, wherein said third and fourth juxtaposed portions respectively define third and fourth magnetically effective areas, and wherein said first and second magnetically effective areas are approximately equal to said third and fourth magnetically effective areas.

2. An electromagnetically actuated fluid valving assembly according to claim 1 and further comprising a thin walled guide tube carried by said armature body means for movement in unison therewith.

3. In electromagnetically actuated fluid valving assembly according to claim 1 wherein said coil means is of an annular configuration and has an axis generally coincident with said central axis, wherein one of said general planes containing one of said air gaps is at a location which is generally one fourth the axial distance from one axial end of said coil means, and wherein the other of said general planes containing the other of said air gaps is at a location which is generally three fourths the axial distance from said one axial end of said coil means.

4. An electromagnetically actuated fluid valving assembly according to claim 1 wherein said coil means is of an annular configuration and has an axis generally coincident with said central axis, wherein said first general plane containing said first air gap is at a location which is generally one fourth the axial distance from one axial end of said coil means, and wherein said second general plane containing said second air gap is at a location which is generally three fourths the axial distance from said one axial end of said coil means.

5. An electromagnetically actuated fluid valving assembly according to claim 2 wherein said thin walled guide tube is separate from said armature body means, and wherein said thin walled guide tube is fixedly secured to said armature body means for said movement in unison therewith.

6. An electromagnetically actuated fluid valving assembly according to claim 1 wherein at least said stator body means comprises at least first and second laminations of magnetic material.

7. An electromagnetically actuated fluid valving assembly according to claim 6 wherein said at least first and second laminations of magnetic material are at least in part electrically insulated from each other.

8. An electromagnetically actuated fluid valving assembly according to claim 6 wherein said stator body means comprises a tubular extension extending axially through said coil means as to have said coil means radially thereabout, and wherein said tubular extension is comprised of said first and second laminations of magnetic material firmly secured to each other.

9. An electromagnetically actuated fluid valving assembly according to claim 8 wherein said at least first and second laminations of magnetic material are at least in part electrically insulated from each other.

10. An electromagnetically actuated fluid valving assembly according to claim 1 wherein said stator body means is provided with slot means extending in the longitudinal direction of said stator body means.

11. An electromagnetically actuated fluid valving assembly according to claim 1 wherein said armature body means is provided with slot means extending in the longitudinal direction of said armature body means.

12. An electromagnetically actuated fluid valving assembly according to claim 1 wherein at least said first and second juxtaposed portions have roughened surfaces to reduce adhesion forces therebetween.

13. An electromagnetically actuated fluid valving assembly according to claim 1 wherein at least said third and fourth juxtaposed portions have roughened surfaces to reduce adhesion forces therebetween.

14. An electromagnetically actuated fluid valving assembly according to claim 1 and further comprising passage means formed through said armature body means for fluid pressure equalization.

15. An electromagnetically actuated fluid valving assembly according to claim 2 and further comprising passage means formed through said thin walled guide tube for fluid pressure equalization.

16. An electromagnetically actuated fluid valving assembly according to claim 2 wherein said thin walled guide tube serves as the valving means of said valving assembly.

17. An electromagnetically actuated fluid valving assembly comprising electrically energizable coil means, stator means, armature means, said coil means being operatively held against movement relative to said stator means, wherein said stator means and said armature means define an operatively closed loop magnetic circuit upon energization of said coil means, wherein said stator means comprises stator body means, wherein said armature means comprises armature body means, a central axis extending through said stator body means and said armature body means, wherein said stator body means is substantially symmetrical about said central axis, wherein said armature body means is substantially symmetrical about said central axis, wherein said stator body means and said armature body means comprise wall means effectively embracing at least a major portion of said coil means, wherein at least a portion of said wall means is of thin wall and of tubular configuration, a working air gap existing between first and second juxtaposed portions of said stator body means and said armature body means respectively, wherein said air gap is generally circular and lies in a general plane extending transversely to said central axis, wherein said coil means is of an annular configuration and has an axis generally coincident with said central axis, wherein said general plane containing said air gap is at a location which is at least one fourth the axial distance from one axial end of said coil means, and a thin walled guide tube carried by said armature body means for movement in unison therewith.

18. An electromagnetically actuated fluid valving assembly according to claim 17 wherein said thin walled guide tube is separate from said armature body means, and wherein said thin walled guide tube is fixedly secured to said armature body means for said movement in unison therewith.

19. An electromagnetically actuated fluid valving assembly according to claim 17 wherein said stator body means is provided with slot means extending in the longitudinal direction of said stator body means.

20. An electromagnetically actuated fluid valving assembly according to claim 17 wherein said armature body means is provided with slot means extending in the longitudinal direction of said armature body means.

21. An electromagnetically actuated fluid valving assembly comprising electrically energizable coil means, stator means, armature means, said coil means being operatively held against movement relative to said stator means, wherein said stator means and said armature means define an operatively closed loop magnetic circuit upon energization of said coil means, wherein said stator means comprises stator body means, wherein said armature means comprises armature body means, a central axis extending through said stator body means and said armature body means, wherein said stator body means is substantially rotationally symmetrical about said central axis, wherein said armature body means is substantially rotationally symmetrical about said central axis, wherein said stator body means and said armature body means comprise wall means effectively embracing at least a major portion of said coil means, wherein at least a portion of said wall means is of thin wall and of tubular configuration, a first working air gap existing between first and second juxtaposed portions of said stator body means and said armature body means respectively, and a second working air gap existing between third and fourth juxtaposed portions of said stator body means and said armature body means respectively, wherein said first and second air gaps are each generally circular, wherein the radius of said second circular air gap as also measured from said central axis is substantially greater than the radius of said first circular air gap as also measured from said central axis, wherein said first and second juxtaposed portions respectively define first and second magnetically effective surface areas, wherein said third and fourth juxtaposed portions respectively define third and fourth magnetically effective surface areas, wherein said first and second magnetically effective surface areas are approximately equal to said third and fourth magnetically effective surface areas, wherein said first and second air gaps are each so positioned as to be at an angle normal to said central axis, and wherein at least a major portion of said armature body means extends axially along said coil means in the direction of said central axis.

22. An electromagnetically actuated fluid valving assembly according to claim 21 and further comprising a thin walled guide tube carried by said armature body means for movement in unison therewith.

23. An electromagnetically actuated fluid valving assembly according to claim 21 wherein said coil means is of an annular configuration and has an axis generally coincident with said central axis, wherein said first air gap lies in a first general plane extending normal to said central axis, wherein said second air gap lies in a second general plane extending normal to said central axis, wherein one of said first and second general planes is at a location which is generally one fourth the axial distance from one axial end of said coil means, and wherein the other of said first and second general planes is at a location which is generally three-fourths the axial distance from said one axial end of said coil means.

24. An electromagnetically actuated fluid valving assembly according to claim 22 wherein said thin walled guide tube is separate from said armature body means, and wherein said thin walled guide tube is fixedly secured to said armature body means for said movement in unison therewith.

25. An electromagnetically actuated fluid valving assembly according to claim 21 wherein at least said stator body means comprises at least first and second laminations of thin magnetic material.

26. An electromagnetically actuated fluid valving assembly according to claim 25 wherein said at least first and second laminations of magnetic material are at least in part electrically insulated from each other.

27. An electromagnetically actuated fluid valving assembly according to claim 25 wherein said stator body means comprises a tubular extension extending axially through said coil means as to have said coil means radially thereabout, and wherein said tubular extension is comprised of said first and second laminations of thin magnetic material firmly secured to each other.

28. An electromagnetically actuated fluid valving assembly according to claim 27 wherein said at least first and second laminations of thin magnetic material are at least in part electrically insulated from each other.

29. An electromagnetically actuated fluid valving assembly according to claim 21 and further characterized by passage means formed through said armature body means for fluid pressure equalization.

30. An electromagnetically actuated fluid valving assembly according to claim 22 and further comprising passage means formed through said thin walled guide tube for fluid pressure equalization.

31. An electromagnetically actuated fluid valving assembly according to claim 22 wherein said thin walled guide tube serves as the valving means of said valving assembly.

32. An electromagnetically actuated fluid valving assembly according to claim 21 wherein said armature body means directly serves as the valving means of said valving assembly.

33. An electromagnetically actuated fluid valving assembly according to claim 21 wherein said armature body means is slidably guided directly by associated support structure.

34. An electromagnetically actuated fluid valving assembly according to claim 21 wherein said armature body means is slidably guided by associated support structure, wherein said armature means and said associated support structure respectively define bearing surface means cooperating to provide for said armature body means being slidably guided, and wherein at least a portion of said fluid is forced to flow between said cooperating bearing surface means to further reduce frictional effects.

* * * * *